(12) United States Patent
Pino

(10) Patent No.: US 6,189,554 B1
(45) Date of Patent: Feb. 20, 2001

(54) FLUSH RELIEF VALVE HAVING FLOATABLE SLEEVE MEMBER

(76) Inventor: Wilton J. Pino, 12233 S. Choctaw Dr., Baton Rouge, LA (US) 70815

(*) Notice: Under 35 U.S.C. 154(b), the term of this patent shall be extended for 0 days.

(21) Appl. No.: 09/558,988

(22) Filed: Apr. 27, 2000

Related U.S. Application Data

(62) Division of application No. 09/185,999, filed on Nov. 4, 1998.

(51) Int. Cl.[7] ........................................ E03B 1/00
(52) U.S. Cl. ............................ 137/1; 137/218; 251/40
(58) Field of Search ........................ 137/218, 1; 251/40

(56) References Cited

U.S. PATENT DOCUMENTS

| | | | |
|---|---|---|---|
| 1,114,398 | * 10/1914 | Sloan | 251/40 |
| 1,573,092 | * 2/1926 | Russell | 251/40 |
| 1,912,937 | * 6/1933 | George | 251/40 |
| 2,024,270 | * 12/1935 | Binnall | 251/40 |
| 2,122,189 | * 6/1938 | Ward | 251/40 |
| 2,302,150 | * 11/1942 | Sloan et al. | 137/218 |
| 2,620,826 | * 12/1952 | Johns | 251/40 |
| 3,085,779 | * 4/1963 | Phillippe | 251/40 |
| 3,334,646 | * 8/1967 | Billeter et al. | 137/218 |
| 3,406,940 | * 10/1968 | Kertell | 251/40 |
| 4,202,525 | * 5/1980 | Govaer et al. | 251/40 |
| 5,564,460 | * 10/1996 | Gronwick et al. | 137/218 |
| 5,730,415 | * 3/1998 | Gronwick | 251/40 |

* cited by examiner

Primary Examiner—George L. Walton

(57) ABSTRACT

Apparatus for delaying initiation of a successive flush cycle in a plumbing system utilizing a diaphragm flush valve having a relief valve assembly provided with a buoyant relief valve sleeve member that can rise in water trapped in the relief valve assembly to a position that prevents operative contact by the flush valve plunger pin.

19 Claims, 3 Drawing Sheets

FLUSH RELIEF VALVE HAVING FLOATABLE SLEEVE MEMBER

RELATED APPLICATION

This is a divisional application of U.S. Ser. No. 09/185,999 filed on Nov. 4, 1998 and entitled Apparatus to Prevent Multiple Flushing.

BACKGROUND OF THE INVENTION

1. Field of the Invention

This invention relates in general to devices to deter rapid re-engagement of valve opening mechanisms, and more particularly, to an improved delay flush control forming part of a diaphragm flush valve used in a toilet, urinal or similar plumbing fixture.

2. Prior Art

Flush valves, and in particular flush valves used in the construction of water closets or urinals, have been used for many years. See, for example, U.S. Pat. No. 30,462 issued Oct. 23, 1860. However, the forerunner to one of the most popular modern diaphragm flush valve designs is disclosed in U.S. Pat. No. 1,714,573 issued May 28, 1929, and commonly referred to as a diaphragm flush valve. One problem with the diaphragm flush valve is controlling the amount of water used when the plunger handle is continuously being activated. This problem is particularly acute in prisons and schools where the persons using the toilet facilities are more likely to misuse the equipment. Principle causes of this problem are holding the plunger handle down for an extended period of time or continuously engaging the plunger handle which unseats the relief valve before a normal flushing cycle has been completed. A modified relief valve which addressed the first cause of this problem and other problems is disclosed in co-pending U.S. patent application Ser. No. 09/152875 entitled "Improved Relief Valve" and filed on Sep. 14, 1998 by the inventor herein. This invention addresses solutions to the second cause of this problem.

Over the years, improvements have been made to the diaphragm flush valve to provide control of the rapidity of the flushing operation employing electronic controls or mechanical controls. However, these improvements involve more complex and expensive construction than is desired by the industry. A second disadvantage of these flush valve designs is that they did not permit a simple retrofitting of the flush valve already installed, but required a more expensive replacement of an otherwise workable flush valve.

OBJECTS AND SUMMARY OF THE INVENTION

Therefore, one object of this invention is to provide an improved plumbing system utilizing an improved flush valve to control the minimum time between flushing operations.

Another object of this invention is to provide an improved relief valve used in conjunction with a diaphragm or similar type flush valve provided with a control means for delaying or retarding the descent of the relief valve sleeve member after a flushing operation has begun.

Still another object of this invention is to provide an improved diaphragm or similar type flush valve containing a relief valve having a floatable sleeve member used in conjunction with a modified vacuum breaker assembly to control the minimum time between flushing operations.

A further object of this invention is to provide an improved combination diaphragm flush valve and vacuum breaker assembly which is inexpensive to manufacture and easy to install in a water closet for controlling the minimum time between flushing actions.

A still further object of this invention is to provide a retrofit assembly and a method of installation that can be utilized with conventional diaphragm or similar type flush valves to control the minimum time between flushing operations.

Another object of this invention is to provide an improved method for operation of a diaphragm flush valve utilized in a plumbing system.

Other objects and advantages of the invention will become apparent from the ensuing descriptions of the invention.

The problem of excess water usage caused by repetitive engagement of the plunger handle can be substantially overcome by delaying the relief valve sleeve member before it resets in a position to be operatively contacted by the plunger pin after the relief valve has been reseated. Experience has indicated that increasing this time at least five seconds, and more preferably at least ten seconds, will be sufficient to discourage most persons from unnecessary repetitive engagement of the flush initiating means. In order not to unduly disrupt normal usage, it is preferred that the delay time not exceed sixty seconds.

In one aspect of this invention the time delay can be achieved by construction of the flush valve to cause the sleeve member to remain positioned out of operative contact with the plunger pin for a predetermined period of time before it is repositioned for operative contact. One such preferred construction is to construct the sleeve member whereby it will float in the water retained in the outlet chamber, and to modify the vacuum breaker to drain water trapped in the outlet chamber of the flush valve when the flush valve diaphragm is reseated.

In another aspect of this invention the time delay can be achieved by constructing the relief valve whereby the rate of descent is retarded. One such way is to construct the contacting surfaces of the sleeve member and stem to create frictional resistance of a predetermined amount. Another construction is to fix the sleeve member to the relief valve by an elastomeric material have predetermined elasticity characteristics.

In still another aspect of this invention the increase in time can be achieved by constructing the relief valve whereby the distance the sleeve member travels after the relief valve has been reseated is greater than the vertical distance it traveled when operatively engaged by the plunge pin. One such preferred construction is to modify the relief valve stem and sleeve member to have cooperating helical groove and nib or ridge members that cause the sleeve member to rotate around the stem as it slides vertically. In a preferred aspect of this embodiment the plunger pin is constructed to force the sleeve member when contacting the sleeve member lower end to vertically move above the plunger pin.

In another embodiment of this invention an improved method for operating a diaphragm flush valve utilized in a plumbing system is provided wherein the relief valve sleeve member is caused to rise out of operative contact position with the plunger pin upon the reseating of the flush valve diaphragm and to retain its raised position for a predetermined length of time before returning to its original position for operative contact by the flush valve plunger pin.

BRIEF DESCRIPTION OF THE DRAWINGS

The specification and the accompanying drawings show and describe preferred embodiments of this invention, but it is to be understood that these embodiments are not intended to be exhaustive nor limiting of the invention, but on the contrary are given for the purpose of illustration in order that others skilled in the art may fully understand the invention and the principles thereof and the manner of applying them in practical use so that they may modify and adapt the invention in various forms, each as may be best suited to the conditions of a particular use.

PREFERRED EMBODIMENTS OF THE INVENTION

As used in this patent, the term "diaphragm flush valve" refers to a flush valve having a fluid inlet chamber, an upper chamber and an outlet chamber, wherein the chambers are separated from one another by a flexible diaphragm provided with a by-pass opening connecting the fluid inlet chamber to the upper chamber and with a central opening connecting the upper and outlet chambers, which central opening is sealable by a relief valve assembly comprising a relief valve having a vertically disposed stem about which a sleeve member can freely slide a predetermined distance, and a plunger assembly having a flush initiating means which when engaged causes a plunger pin to operatively contact the sleeve member unseating the sealing member and permitting flow of fluid from the upper chamber to the lower chamber. Without any intent to restrict the definition of diaphragm flush valves, examples of such are described in U.S. Pat. Nos. 1,714,573, 2,776,812, 3,399,860, 3,556, 137, 3,656,499, 4,327,891, 5,013,007, 5,026,021, 5,295,655, 5,335,694, 5,415,374, and 5,649,686.

Also as used in this patent, the term "vacuum breaker assembly" is used to include any device utilized to prevent back siphonage from a polluted fluid source, such as a toilet, back into the non-polluted fluid supply feeding into device, which is constructed having an elastomeric inner liner with a receiving end into which the fluid is received by the device and a discharge end having a sealable opening through which the fluid must pass before being discharged from the device. Without any intent to restrict the definition of vacuum breaker assembly, examples of such are described in U.S. Pat. Nos. 3,334,646, 3,797,515, 5,060,687, 5,454,396, and 5,564,460.

Figure 1:
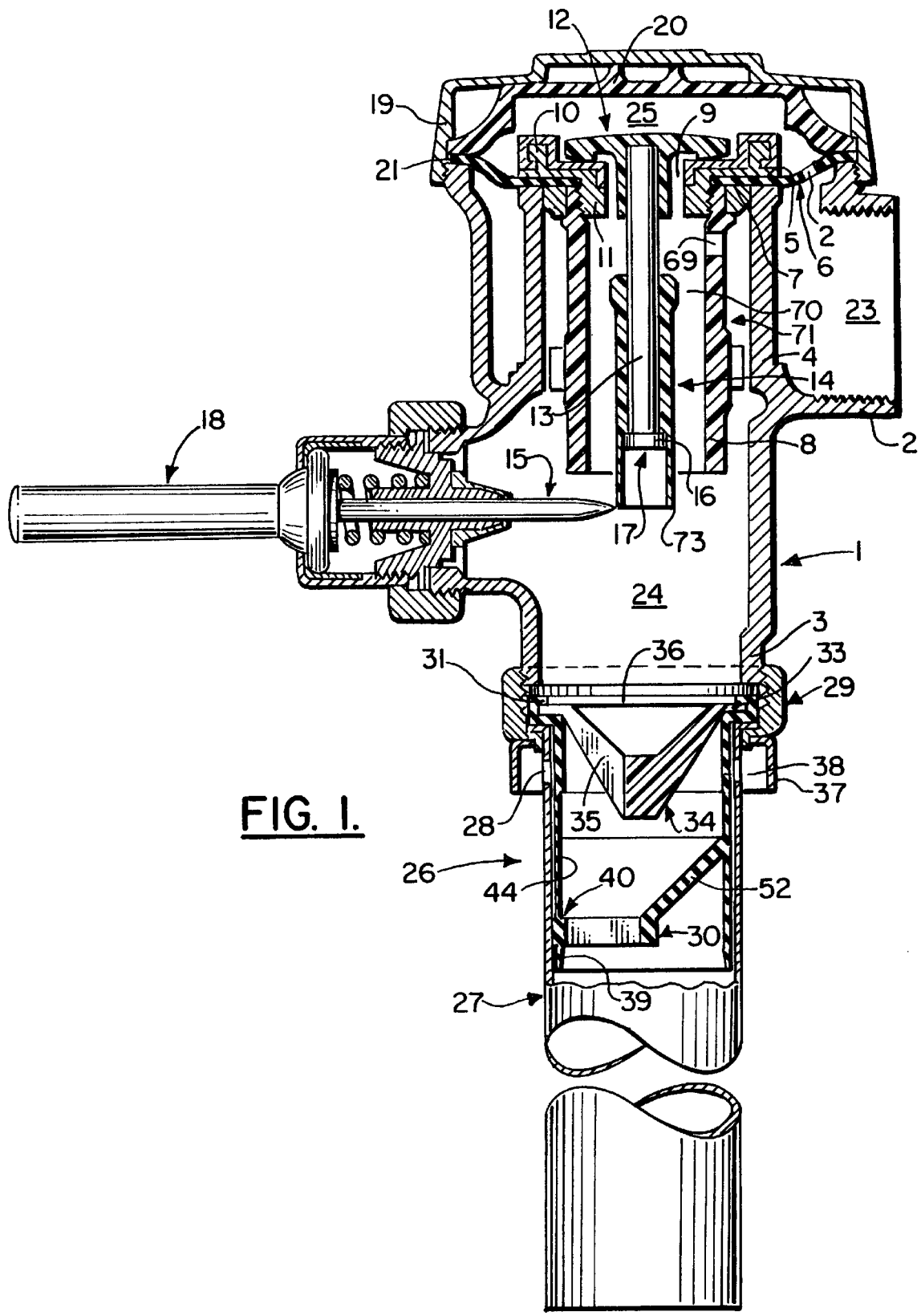
FIG. 1 is a cross-sectional view of a conventional diaphragm flush valve and vacuum breaker assembly positioned for use in a typical water closet.
Figure 2:
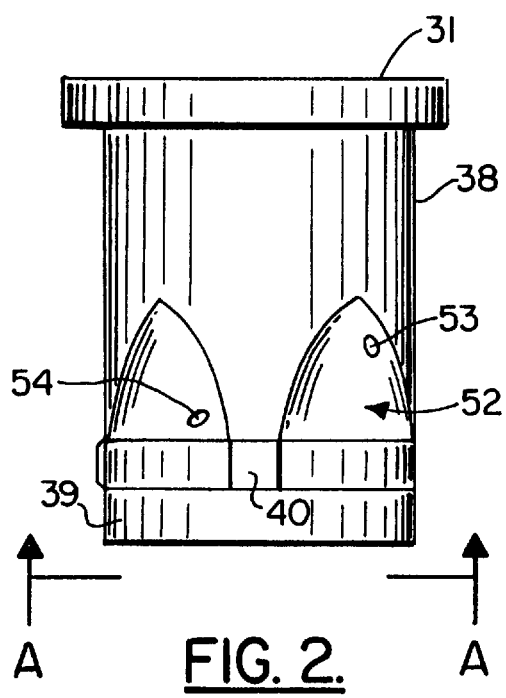
FIG. 2 is a three-dimensional view of a vacuum breaker inner liner similar to that illustrated in FIG. 1, but in accordance with a preferred embodiment of this invention provided with drainage openings.
Figure 2B:
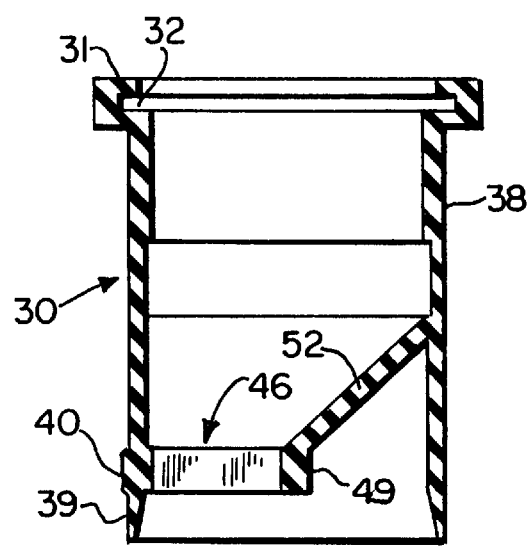
FIG. 2B is a cross-sectional view of the vacuum breaker of taken along lines B—B of FIG. 2A.
Figure 2A:
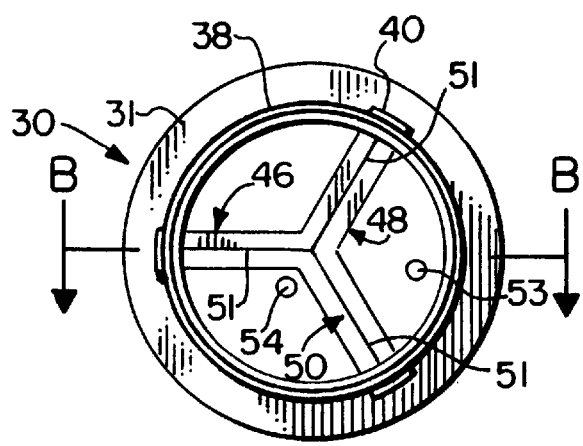
FIG. 2A is a bottom view of the vacuum breaker of FIG. 2 taken along lines A—A.
Figure 2C:
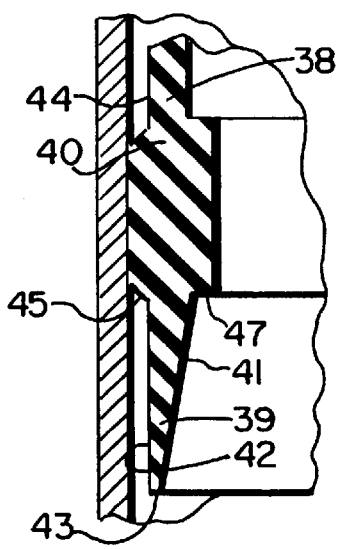
FIG. 2C is a partial cross-sectional view of the vacuum breaker of FIG. 2 illustrating the low energy, large surface area lip seal used in certain conventional vacuum breaker inner liners.

A prior art embodiment of a diaphragm flush valve and a vacuum breaker assembly installed in a water closet is illustrated in FIG. 1. The flush valve includes the brass body 1 provided with an inlet section 2 connectable to a pressurized water supply. Section 2 forms inlet chamber 23. Body 1 also is provided with an outlet section 3 forming an outlet chamber 24 through which water exits the flush valve. Between the inlet and outlet sections there is an internal upstanding barrel 4. The upper edge portion of barrel 4 forms the annular main valve seat 5. The main valve member comprises a flexible circular rubber diaphragm 6 having a bottom valve seating portion 7 and which is clamped to the top end of a cylindrical guide member 8, made of a plastic material such as CYCLOLAC7, extending downward within the barrel 4. The diaphragm 6 is provided with a central opening 9 through which a clamping disc 10 extends with a portion 11 threaded into the guide member 8 and thereby clamps the diaphragm 6 tightly between them. A relief valve 12 which may be made of DELRIN7 plastic material is carried by the clamping disc 10 and has a depending operating stem 13 made of brass or other metal. Stem 13 extends downward through the diaphragm opening 9 and within the guide member 8. Sleeve member 14 which telescopes about stem 13 may be made of DELRIN7 plastic material and is positioned opposite plunger pin 15 when it rests on the upper surface of shoulders 16 forming a stop member 17 at The lower end of stem 13. Plunger pin 15 actively engages sleeve member 14 by its inward movement into the flush valve outlet chamber 24 when handle 18 is moved off axis from plunger pin 15. Other flush initiating means include various electronic sensors or mechanical push button devices, such as described in U.S. Pat. Nos. 2,507, 966, 2,688,141, 3,066,314, 3,695,288, 3,778,023 and 4,891, 864.

The valve body 1 is provided with an external cover 19 and an internal cover 20, the latter preferably being made of an ABS plastic molded material such as CYCLOLAC7. The external cover 19 is screw threaded around the top end of the body 1 and provided with a shoulder which engages the outer peripheral edge of internal cover 20 and presses it downwardly against the edge 21 of the diaphragm 6 to clamp the diaphragm firmly around its periphery into position in the valve body.

In the ordinary operation of the flush valve described, the water pressures in inlet chamber 23 and upper chamber 25 are equalized above and below the diaphragm 6 by the flow of water through the small by-pass opening 22. Since the pressure area above the diaphragm in upper chamber 25 is greater than that in outlet chamber 24 below the diaphragm, the diaphragm is held tightly against main valve seat 5, thereby shutting off the water flow between the inlet chamber 23 and outlet chamber 24. The engagement of the plunger pin 15 with sleeve member 14 causes sleeve member 14 to tilt stem 13 from its vertical axis. The tilting of stem 13 causes relief valve 12 to also tilt from its seat. With relief valve 12 tilted, water can flow from the upper chamber 23 through guide member 8 and into the outlet chamber 24 reducing the pressure in upper chamber 23. This reduction in pressure now permits water from inlet chamber 23 to flex and lift diaphragm 6 from main valve seat 5 permitting water to flow from inlet chamber 23 over the top edge of barrel 4 and into outlet chamber 24 to initiate the flushing action.

Once plunger pin 15 is no longer operatively contacting sleeve member 14; i.e., no longer causing sleeve member 14 to tilt or otherwise prevent relief valve 12 from reseating, relief valve 12 can be reseated. This allows water is from the inlet chamber 23 to refill upper chamber 25 until the pressure in upper chamber 25 is again equalized to that in inlet chamber 23. With the pressure again equalized, diaphragm 6 reseats preventing further flow of water from the inlet chamber 23 to the outlet chamber 24. The amount of water which flows into the outlet chamber 24 is controlled at least in part by the time required to achieve pressure equalization in the inlet and upper chambers resulting from the refilling of upper chamber 25 with water.

Sleeve member 14 depending from stem 13 is constructed to slide up along stem 13 a sufficient distance to permit sleeve member 14 to rest in a non-operative position above plunger pin 15 if the flush handle 18 is held unduly long in the operated position. In this position the relief valve 12 is no longer tilted and will automatically reseat closing central opening 9. In a normal flushing action, flush handle 18 is pushed off axis and then quickly released. In this case, sleeve member 14 descends to its original position and relief valve 12 is reseated. Typically, this unseating and reseating of the relief valve 12 takes place in less than one second, which is sufficient time to permit diaphragm 6 to be unseated by the water pressure in inlet chamber 23 and for the desired amount of water to flow first into outlet chamber 24 and then through vacuum breaker assembly 26 to the water closet bowl (not shown) to complete the flushing action.

To prevent waste water backup into the flush valve and possibly the water supply lines, government regulations require the use of some type of structure to prevent this possibility from occurring. One such structure is a vacuum breaker assembly. FIG. 1 illustrates one type of standard vacuum breaker assembly, such as described in U.S. Pat. No. 5,564,460, that is used in a water closet to prevent back siphonage from the water closet back into the potable water supply feeding the flush valve. Vacuum breaker assembly 26 includes an outlet tube 27 having peripherally spaced air openings 28. A coupling nut 29 is used to attach vacuum breaker assembly 26 to lower section 3. The downstream end of outlet tube 27 will be connected to the inlet side of the water closet or urinal (not shown).

Positioned inside of outlet tube 27 is a vacuum breaker inner liner 30 which is suitably formed of a rubber like or flexible elastomeric material. As is illustrated in FIGS. 2 and 2A–C, the upstream end of vacuum breaker inner liner 30 includes a flange 31 having a recess 32 which supports the outwardly extending flange 33 of an insert or stiffening funnel 34. Stiffening funnel 34 includes a plurality of openings 35 for the passage of water. A slip ring 36 is seated on top of flange 31 and forms a portion of the connection between the coupling nut 29 and the outlet end of the flush valve. There is a hood 37 which may be crimped onto the lower end of coupling nut 29 and is used as a shield for air openings 28. The hood is spaced from the air openings so that they may perform their intended function of admitting air at atmospheric pressure into the interior of the vacuum breaker assembly 26 to prevent back siphonage.

Vacuum breaker inner liner 30 includes a body 38 constructed from an elastomer which extends from flange 31. The body is cylindrical and terminates at its lower end in a low energy large surface area lip seal 39. There are a plurality of generally equally spaced projections 40 on the exterior of vacuum breaker inner liner 30, with these projections being adjacent the downstream end of the sleeve. They are effective to align, locate and space the exterior wall of body 38 from the interior of the outlet tube so that air from air openings 28 may enter the space beneath the vacuum breaker sleeve 28 to prevent back siphonage.

The lip seal 39 extends from the downstream end of body 38 directly adjacent the projections 40 and includes a gradually outwardly tapering inner surface 41 and a coaxial or cylindrical outer surface 42, with these two surfaces terminating in the end 43 of lip seal 39. The outer surface 42 is generally continuous with the outer cylindrical surface of body 38. The tapered interior surface 41, at its upper end, is an extension of the interior surface 44 of body 38. The shoulders 45 and 47 are formed between lip seal 39 and projections 40 and the interior valve which controls the flow of water through the flexible sleeve. The large surface area lip seal 39, however, is basically a continuation of the interior and exterior surfaces of body 38.

The interior of vacuum breaker inner liner 30 has three lip seals indicated at 46, 48 and 50. Each of these lip seals, at the lower exterior thereof, has ribs 49 which are slightly thicker than other portions of the lip seals, with the ribs defining between them a slit 51 which can open to permit the passage of water through the vacuum breaker assembly 26. Each of the ribs 49, at their upper ends, join with walls 52 with the upper end of each of the walls 52 being integral with the body 38. There are two walls 52 between each adjacent pair of ribs 51.

In normal use the flow of water into the vacuum breaker assembly 26 will pass through the stiffening funnel 34, with water pressure forcing the lip seals 46, 48, and 50 to spread apart, permitting water to flow through slits 51 to the water closet, or other plumbing fixtures, connected at the outlet end of the vacuum breaker assembly 26. In the event there is a negative pressure at the water supply, air will flow in through the air openings 28, causing the walls of the vacuum breaker inner liner 30 to collapse upon the support funnel 34, preventing the passage of water from the downstream water closet into the potable water supply. The lip seals 46, 48, and 50 assist in preventing such back siphonage. In the event there is a dramatic increase in back pressure because of a water closet restriction as described, the downstream lip seal 39, being thin and directly adjacent the wall of the outlet tube, will rapidly move outwardly against the wall to seal air openings 28.

As the water pressure diminishes in vacuum breaker assembly 26 with the reseating of diaphragm 6, slits 51 close trapping water above slits 51 and in outlet chamber 24. However, it has been discovered that if the elastomeric inner liner 30 is provided with at least two openings 53 and 54 vertically spaced from one another, and preferably positioned in walls 52, then water in the outlet chamber 24 can be drained at a controlled rate. The time required for the water to drain can be controlled at least in part by the sizing of the two openings. It is preferred that the cross-sectional area of opening 54 be at least as great, and more preferably greater, than the cross-sectional area of opening 53. If sleeve member 14 is constructed to float in water, then its descent after the flushing cycle can be delayed by the water filling outlet chamber 24.

Figure 4:
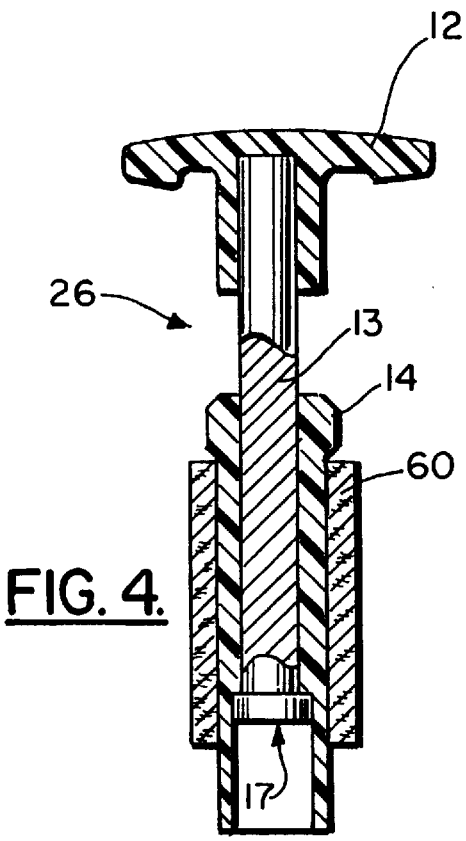
FIG. 4 is a cutaway view of another preferred embodiment of a relief valve that has been retrofitted in accordance with this invention.
Figure 3:
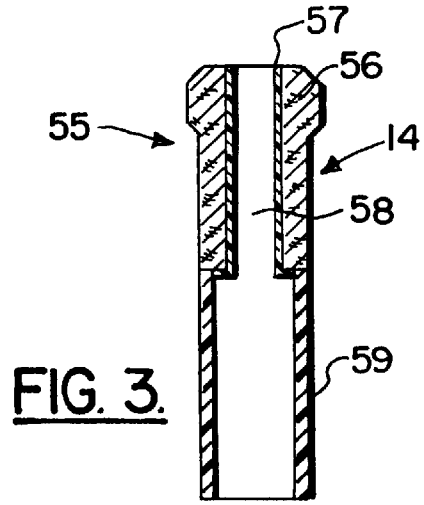
FIG. 3 is a cross-sectional view of a preferred embodiment of a relief valve sleeve member utilized in a diaphragm flush valve in accordance with this invention.

FIGS. 3 and 4 illustrate alternate embodiments of a sleeve member capable of floating in water. In FIG. 3 sleeve member 14 comprises an upper section 55 whose outer layer 56 is constructed from material having a density less than water and an inner layer 57 constructed from material, such as a hard plastic, that provides the rigidity needed for sleeve member 14 to retain the integrity of its passageway 58 permitting it to slide along stem 13. The lower section 59, also comprising part of sleeve member 14, may be constructed from the same or different material as inner layer 57. If the material used to construct outer layer 56 has the necessary rigidity to retain the integrity of passageway 58, then the entire sleeve member 14 can be constructed from the same material. Without attempting to limit the materials which can be used to construct outer layer 56, examples would include low density polyurethane or similar honeycombed or foamed material, wood, cork, etc.

FIG. 4 illustrates an alternate embodiment especially suited for retrofitting existing sleeve members to permit them to float. In this embodiment, outer sleeve 60 is constructed of material having a density less than water and sized to cause sleeve member 14 to be capable of floating, in water. In a more preferred embodiment outer sleeve 60 will fit snugly about sleeve member 14, and still more preferably be constructed of an elastomer that can be stretched over sleeve member 14 and then will constrict to be mechanically fixed to sleeve member 14. In this preferred embodiment, a plumbing system employing a standard diaphragm flush valve and vacuum breaker assembly can be quickly retrofitted to form one embodiment of this invention. This retrofit can be accomplished by unscrewing external cover 19 from flush valve body 1 and removing the internal cover 20 exposing relief valve assembly 26. Relief valve assembly 26 is lifted out of body 1 and then outer sleeve 60 is slipped over sleeve member 14. The modified relief valve assembly 26 is reinserted into body 1, and the internal and external covers secured back into position. To modify inner liner 30 coupling nut 29 is loosened to separate the flush valve from the vacuum breaker assembly 26. Inner liner 30 is removed and openings 53 and 54 punched or cut by any standard tool useful for that purpose. Inner lining 30 is reinserted into outlet tube 27 and coupling nut 29 is then tightened to reconnect the flush valve to the vacuum breaker assembly 26.

The function of openings 53 and 54 in inner liner wall is to allow any water in outlet chamber 24 to drain out through the openings 53 and 54 when inner liner slits 51 are closed. In is normal operation plunger pin 15 operatively contacts sleeve member 14, water from inlet chamber 23 flows through outlet chamber 24 until diaphragm 6 is re-seated. However, as the water pressure is decreased due to the resisting of diaphragm 6, inner wall slits 51 will close trapping the outlet chamber 24. The water in outlet chamber 24 causes the buoyant sleeve member 14 to float up along stem 16 into a position above plunger pin 15 where it can no longer be operatively contacted. Sleeve member 14 will remain out of position for operative contact with the plunger pin 15 until the water level in outlet chamber 24 has been lowered sufficiently by the loss of water through openings 53 and 54. In this embodiment it is preferred that guide member 8 be provided with at least one opening 69 (see FIG. 1) which connects outlet chamber sections 70 and 71 located on either side of guide member 8. Opening 69 helps prevent the possibility that a negative pressure situation might prevent water in sections 70 and 71 from draining.

Figure 5:
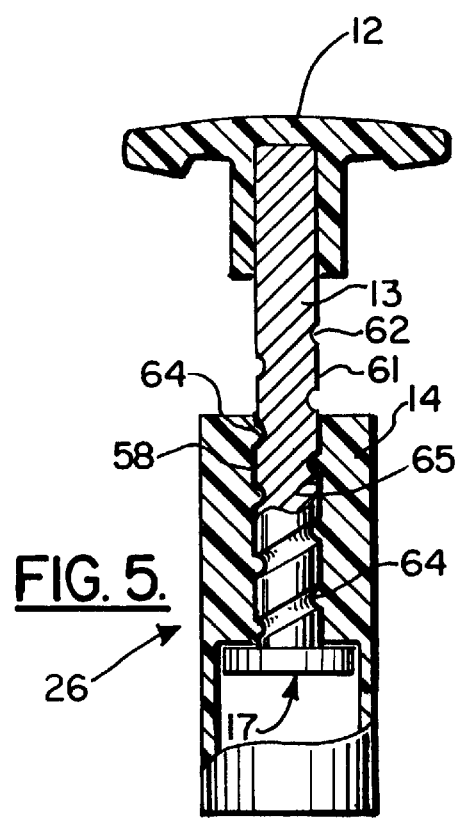
FIG. 5 is a cutaway view of another preferred embodiment of a relief valve of this invention whose sleeve member and stem are structured to cause the sleeve member to travel around the stem as it slides along the stem.
Figure 6:
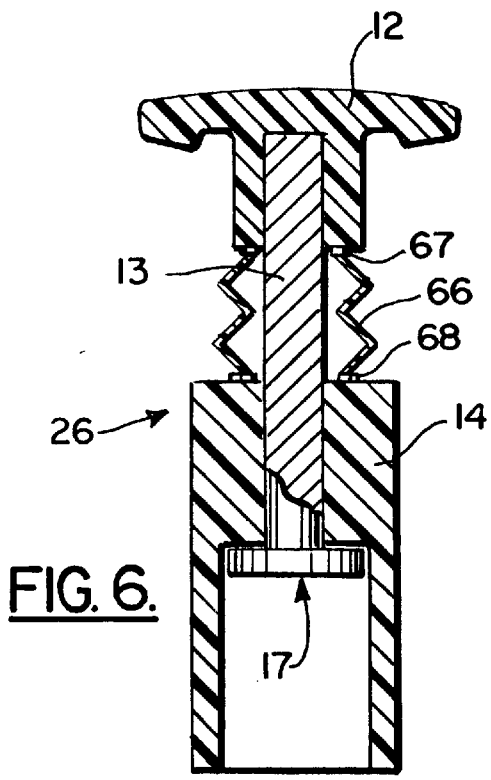
FIG. 6 is a cutaway view of another preferred embodiment of a relief valve utilizing a compressible member in accordance with this invention.

FIGS. 5 and 6 illustrate alternate embodiments of a modified relief valve assembly 26 in which sleeve member 14 can be detained for a period of time from assuming a position permitting the plunger pin 15 from operatively engaging sleeve member 14 to initiate a successive flushing cycle. In FIG. 5 the wall surface 61 of stem 13 is provided with a helical groove 62 extending above stop member 17 and ending at least at a distance from stop member 17 greater than the distance sleeve member 14 must travel to avoid operative contact with plunger pin 15 when it has been activated by plunger handle 18. The wall surface 63 forming sleeve member passageway 58 is provided with one or more nibs 64 positioned to extend into groove 62 to cause sleeve member 14 to rotate about stem 13 as it moves along stem wall surface 61. In an alternate embodiment a helical ridge which loosely mates with groove 62 can be utilized in place of, or in conjunction with, nibs 64. The pitch of the helix shape of groove 62 can be set to control the distance in which sleeve member 14 must travel before it again rests on stop member 17. Furthermore, because of the frictional forces between the nibs 64 (or ridge) and the walls forming groove 62, the speed at which sleeve member 14 descends can also be controlled. In an alternate embodiment nibs 64 may extend from stem surface 61 and be sized to fit into a corresponding helical groove in wall surface 65 forming passageway 58.

The embodiment such as illustrated in FIG. 5 can be used alone or in conjunction with the floating sleeve member described above. If used alone, it is preferred that plunger pin 15 be constructed having a conical shaped end 72 such as illustrated in FIG. 1. It is further preferred that end 72 operatively contact sleeve member 14 at its lower end 73. It is further preferred that the inward movement of plunger pin 15 be sufficient to cause sleeve member 14 to vertically rise a distance sufficient to position it above plunger pin 15. In this embodiment sleeve member 14 will be required to travel some distance before it is in position for operative contact by plunger pin 15.

In FIG. 6 an elastomer member 66 is connected at its opposite ends 67 and 68 to relief valve 12 and sleeve member 14, respectively. Member 66 is constructed from materials having elastomeric properties that increase the time required for sleeve member 14 to travel before it again rests on stop member 17 after having been operatively contacted by plunger pin 15. In this embodiment the upward movement of sleeve member 14 will compress elastomer member 66. Elastomer member 66 is such that over time it will rebound to its original non-compressed shape where once again sleeve member 14 will be in a position for operative contact by plunger pin 15.

There are of course other alternate embodiments which are obvious from the foregoing descriptions of the invention. These and the other obvious alternate embodiments are intended to be included within the scope of the invention as defined by the following claims.

What I claim is:

1. An improved method for operation of a diaphragm flush valve utilized in a plumbing system, the improvement to which comprises:

(a) causing the relief valve sleeve member to be positioned in non-operative contact with the flush valve plunger pin after the relief valve has been unseated, and (b) retaining said sleeve member in a position of non-operative contact for a predetermined period of time at least one second greater than the time for said sleeve member to travel to said position under free fall conditions.

2. An improved method according to claim 1 wherein said predetermined period of time is at least five seconds.

3. An improved method according to claim 2 wherein said predetermined period of time is between about ten seconds and about sixty seconds.

4. A relief valve for use in a diaphragm flush valve, the improvement to which comprises the relief valve stem, the relief valve sleeve member, or a combination thereof, constructed to require the time for said sleeve member to travel from a first position wherein said sleeve member is out of operative contact with the diaphragm flush valve plunger pin to a second position wherein said sleeve member can be operatively engaged by said plunger pin to be at least one second greater than the time for said sleeve member to travel from said first position to said second position in free fall.

5. A relief valve according to claim 4 for use in a diaphragm flush valve contained in a fluid flow control plumbing fixture having a vacuum breaker assembly, wherein the sleeve member of the relief valve is constructed to have a density that requires the time for said sleeve member to travel from said first position to said second position to be at least one second greater than the time for said sleeve member to travel from said first position to said second position in free fall.

6. In a relief valve according to claim 5 said sleeve member being constructed to have a density less than said fluid.

7. In a relief valve according to claim 6 said sleeve member being constructed at least in part from material having a density less than said fluid.

8. A relief valve according to claim 5, wherein said sleeve member and said stem are positioned in frictional contact with one another during movement of said sleeve member.

9. A relief valve according to claim 8, further comprising a member having predetermined elastomeric properties attached to said sleeve member and said seating member or said stem in a manner to reduce the rate of descent of said sleeve member to a rate less than the rate of a free fall descent.

10. A relief valve according to claim 5, further comprising a member having predetermined elastomeric properties attached to said sleeve member and said seating member or said stem in a manner to reduce the rate of descent of said sleeve member to a rate less than the rate of a free fall descent.

11. A relief valve according to claim 4, wherein said sleeve member and said stem are positioned in frictional contact with one another during movement of said sleeve member.

12. A relief valve according to claim 11, wherein a helical groove extends along the outer surface of said stem and wherein a nib extends outward from the interior wall surface of said sleeve member a sufficient distance and is sized to fit within said groove to cause said sleeve member to revolve around said stem when said sleeve member moves vertically relative to said stem.

13. A relief valve according to claim 12, further comprising a member having predetermined elastomeric properties attached to said sleeve member and said seating member or said stem in a manner to reduce the rate of descent of said sleeve member to a rate less than the rate of a free fall descent.

14. A relief valve according to claim 11, wherein a helical groove extends along the interior wall surface of said sleeve and wherein a nib extends from the exterior surface of said stem and is sized to fit within said groove to cause said sleeve member to revolve around said stem when said sleeve member moves vertically relative to said stem.

15. A relief valve according to claim 14, further comprising a member having predetermined elastomeric properties attached to said sleeve member and said seating member or said stem in a manner to reduce the rate of descent of said sleeve member to a rate less than the rate of a free fall descent.

16. A relief valve according to claim 4, further comprising a member having predetermined elastomeric properties attached to said sleeve member and said seating member or said stem in a manner to reduce the rate of descent of said sleeve member to a rate less than the rate of a free fall descent.

17. In a relief valve for use in a diaphragm flush valve contained in a fluid flow control plumbing fixture having a vacuum breaker assembly, wherein the plumbing fixture is constructed to permit at least a portion of any fluid trapped in the outlet chamber of the diaphragm flush valve by the vacuum breaker assembly to drain therefrom when the relief valve is seated, the improvement to which comprises the sleeve member of the relief valve being constructed to have a density that requires the time for said sleeve member to travel from a first position wherein said sleeve member is out of operative contact with the diaphragm flush valve plunger pin to a second position wherein said sleeve member can be operatively engaged by said plunger pin to be at least one second greater than the time for said sleeve member to travel from said first position to said second position in free fall.

18. In a relief valve according to claim 17 said sleeve member being constructed to have a density less than said fluid.

19. In a relief valve according to claim 18 said sleeve member being constructed at least in part from material having a density less than said fluid.

* * * * *